US012614491B2

(12) United States Patent
Young et al.

(10) Patent No.: US 12,614,491 B2
(45) Date of Patent: Apr. 28, 2026

(54) DISPLAY PIPELINE FOR VOLTAGE-DEPENDENT SUB-PIXEL UNIFORMITY CORRECTION

(71) Applicant: Apple Inc., Cupertino, CA (US)

(72) Inventors: Vincent Z Young, San Francisco, CA (US); Mahesh B Chappalli, San Jose, CA (US); Maofeng Yang, Santa Clara, CA (US); Weijun Yao, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/328,661

(22) Filed: Jun. 2, 2023

(65) Prior Publication Data

US 2024/0404445 A1 Dec. 5, 2024

(51) Int. Cl.
*G09G 3/20* (2006.01)
*G09G 3/36* (2006.01)

(52) U.S. Cl.
CPC ......... *G09G 3/2003* (2013.01); *G09G 3/3607* (2013.01); *G09G 2300/0452* (2013.01); *G09G 2320/0233* (2013.01); *G09G 2320/0242* (2013.01); *G09G 2320/0285* (2013.01); *G09G 2330/028* (2013.01); *G09G 2360/16* (2013.01)

(58) Field of Classification Search
CPC ............... G09G 3/2003; G09G 3/3607; G09G 2300/0452; G09G 2320/0233; G09G 2320/0242; G09G 2320/0285; G09G 2330/028; G09G 2360/16
USPC .............................................. 345/76–89, 690
See application file for complete search history.

(56) References Cited

U.S. PATENT DOCUMENTS

| | | | | |
|---|---|---|---|---|
| 10,032,405 | B2 | 7/2018 | Jeong et al. | |
| 10,553,162 | B2 | 2/2020 | Lu et al. | |
| 10,839,772 | B2 | 11/2020 | Hyun | |
| 11,200,867 | B1 | 12/2021 | Yang et al. | |
| 12,148,398 | B2 * | 11/2024 | Sha | G09G 3/34 |
| 2009/0058772 | A1 * | 3/2009 | Lee | G09G 3/3233 345/82 |
| 2012/0081410 | A1 * | 4/2012 | Yeo | G09G 3/2092 345/212 |
| 2015/0255025 | A1 | 9/2015 | Chen et al. | |
| 2016/0365024 | A1 * | 12/2016 | Pyo | G09G 3/3233 |

(Continued)

FOREIGN PATENT DOCUMENTS

| | | | | |
|---|---|---|---|---|
| CN | 107248389 A | | 10/2017 | |
| WO | WO-2020140313 A1 | * | 7/2020 | G09G 3/34 |

*Primary Examiner* — Kwin Xie
(74) *Attorney, Agent, or Firm* — Fletcher Yoder, P.C.

(57) ABSTRACT

An electronic device may include a display panel comprising a plurality of display pixels, an image source configured to store image data, and image processing circuitry. The image processing circuitry may receive the image data configured to be displayed by the plurality of display pixels, wherein the image data comprises gray level data for a first display pixel of the plurality of display pixels, convert the gray level data to first voltage data, and select a plurality of compensation maps based on a brightness level of the display panel. The image processing circuitry may also determine a voltage offset value based on the input voltage and the plurality of compensation maps, apply the voltage offset value to the first voltage data to generate compensated voltage data, and convert the compensated voltage data into compensated gray level data for the first display pixel.

20 Claims, 11 Drawing Sheets

(56) References Cited

U.S. PATENT DOCUMENTS

| | | | | |
|---|---|---|---|---|
| 2017/0169790 | A1* | 6/2017 | Richards | G02B 27/0176 |
| 2017/0345358 | A1* | 11/2017 | Xu | G09G 3/3225 |
| 2018/0075798 | A1* | 3/2018 | Nho | G09G 3/32 |
| 2018/0254020 | A1* | 9/2018 | Buckley | G09G 3/344 |
| 2021/0407446 | A1* | 12/2021 | Wang | G09G 3/3611 |
| 2022/0375388 | A1* | 11/2022 | Kim | G09G 3/2003 |
| 2022/0415240 | A1 | 12/2022 | Park et al. | |
| 2023/0154415 | A1* | 5/2023 | Jang | G09G 3/3208<br>345/690 |

* cited by examiner

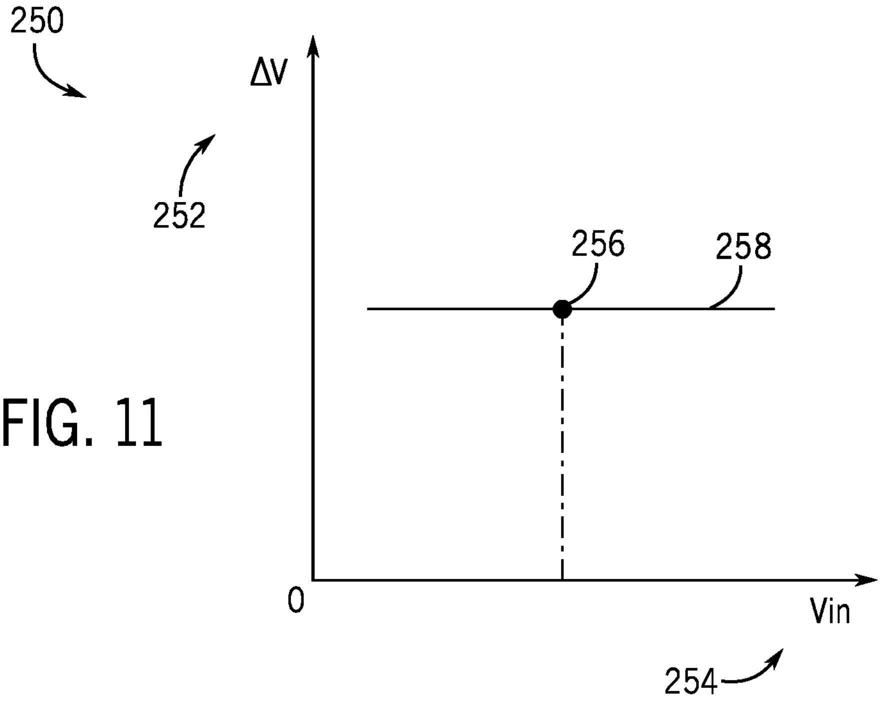
FIG. 11
FIG. 12
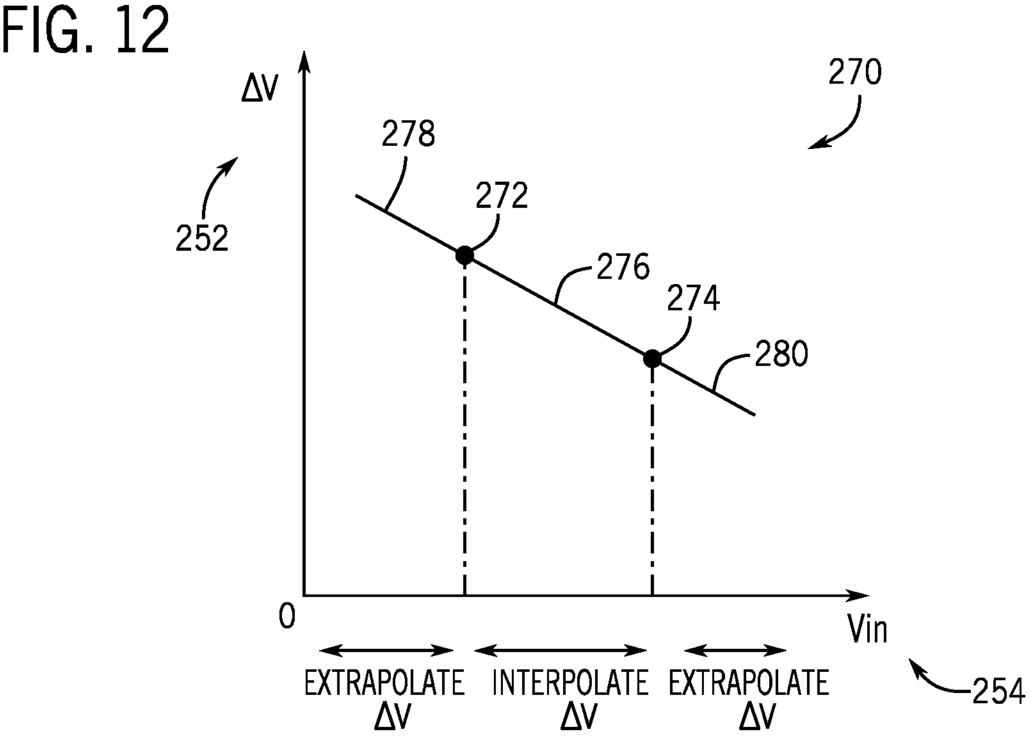

DISPLAY PIPELINE FOR VOLTAGE-DEPENDENT SUB-PIXEL UNIFORMITY CORRECTION

BACKGROUND

The disclosure relates generally to electronic devices with display panels, and more particularly, to schemes for sub-pixel uniformity compensation corrections on a display panel.

Electronic displays may be found in numerous electronic devices, from mobile phones to computers, televisions, automobile dashboards, and augmented reality or virtual reality glasses, to name just a few. In certain electronic display devices, light-emitting diodes such as organic light-emitting diodes (OLEDs), micro-LEDs (μLEDs), or active matrix organic light-emitting diodes (AMOLEDs) may be employed as display pixels to depict a range of gray levels for display. However, due to various properties associated with the manufacturing of the display, the driving scheme of the display pixels within the display device, and other characteristics related to the display, a particular gray level output by one display pixel may be different from a gray level output by another display pixel in the same display device upon receiving the same electrical input.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to identifying and compensating for display pixel (e.g., sub-pixel) non-uniformity. For example, manufacturing tolerances for display pixels and/or displays may result in one display pixel outputting a particular gray level that may be different from a gray level output by another display pixel in the same display, even if the display pixels receive similar (or substantially similar) electrical inputs. As a result, a displayed image may have image artifacts. In certain instances, a uniformity compensation may be applied to the image data to account for differences in display pixel emissions. For example, digital values used to generate gray levels for various pixels may be compensated to account for these differences based on certain characteristics of the display. A digital compensation value for a gray level to be output by a display pixel may be determined based on optical wave or electrical wave testing performed on the display during the manufacturing. In addition, the digital compensation value for the gray level may be determined based on real time color sensing circuitry, predictive modeling algorithms based on sensor data (e.g., thermal, ambient light) acquired by circuitry disposed in the display, and the like. Based on the results of the testing, sensing, or modeling, compensation data (e.g., a compensation map) may be determined for the display pixels of the electronic display. In certain instances, the compensation may be inhibited at higher dynamic ranges (e.g., low luminance levels) and emissions of some display pixels may be relatively dark while emissions of other display pixels may be relatively bright. As such, this compensation may result in a loss of dynamic range, thereby producing display images with a reduced contrast that may be perceivable at low luminance levels.

To provide uniformity compensation during display operations of the electronic display, image processing circuitry and/or software may apply a compensation (e.g., voltage offset) to each display pixel through compensated image data based on multiple compensation maps. For example, a sub-pixel uniformity compensation (SPUC) block may receive image data and a global brightness level (e.g., value), determine a number of compensation maps based on the global brightness level, determine the compensation value based on the compensation maps, and generate compensated image data to provide for sub-pixel uniformity corrections across a wide range of luminance in a high dynamic range.

Indeed, the sub-pixel uniformity correction may be performed to adjust image data values accordingly, such as before the image data may be sent to the electronic display, to reduce or eliminate the appearance of image artifacts, non-uniformity, reduced contrast, and the like. The sub-pixel uniformity correction may be applied per pixel or sub-pixel based on a brightness-to-data relationship. For example, the brightness-to-data relationship is generally referred to as a brightness-to-voltage (Lv-V) relationship, which is the case when the data signal is a voltage signal. The brightness-to data relationship may also be used when the data signal represents a current (e.g., a brightness-to-current relationship (Lv-I)) or a power (e.g., a brightness-to-power relationship (Lv-W)). It should be appreciated that further references to brightness-to-voltage (Lv-V) are intended to also apply to any suitable brightness-to-data relationship, such as a brightness-to-current relationship (Lv-I), brightness-to-power relationship (Lv-W), or the like. The predicted brightness-to-data relationship may be expressed as a curve, which may facilitate determining the appropriate data signal to transmit to the pixel to cause emission at a target brightness level of light. In addition, some examples may include a regional or global adjustment to further correct non-uniformities of the electronic display. In this way, the display pixels of the electronic display may output a similar gray level when receiving the adjusted image data. As such, perceivable visual image artifacts due to non-uniformity of the display pixels may be reduced or eliminated.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 11 is a graphical representation of determining a uniformity compensation using one compensation map, in accordance with an embodiment;

FIG. 12 is a graphical representation of determining a uniformity compensation using two compensation maps and extrapolating to a nearest compensation map, in accordance with an embodiment;

DETAILED DESCRIPTION

Figure 1:
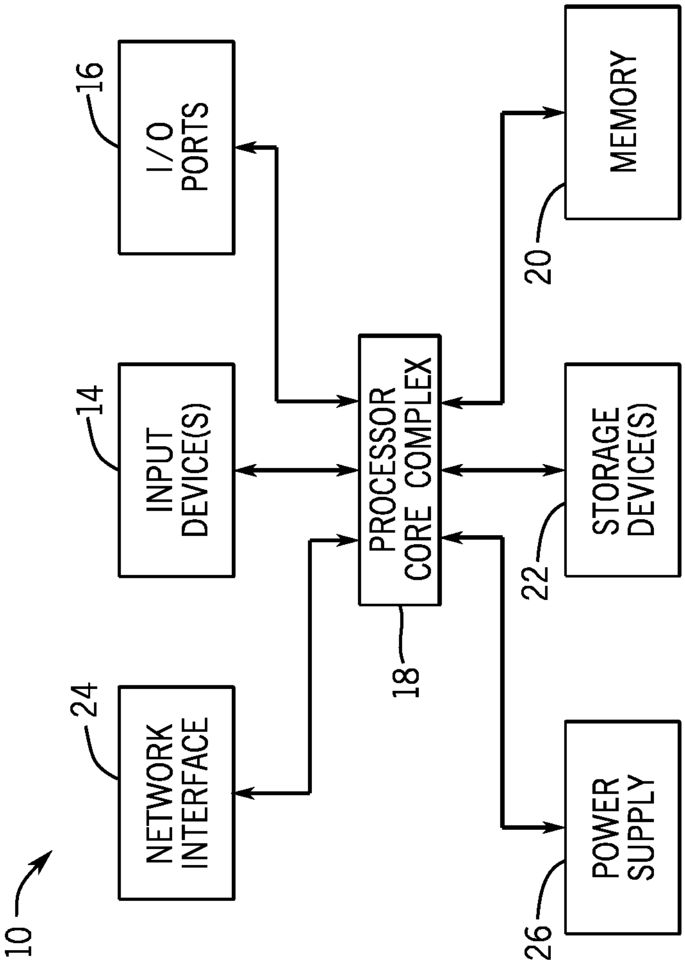
FIG. 1 is a block diagram of an electronic device having an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, vehicle dashboards, and so on. To display an image, the electronic display may control a gray level (e.g., luminance) of its display pixels based on corresponding image data received at a particular resolution. For example, an image data source may provide image data as a stream of pixel data, in which data for each pixel indicates a target luminance (e.g., brightness, color) of one or more display pixels located at corresponding pixel positions. In an embodiment, image data may indicate luminance per color component, for example, via red component image data, blue component image data, and green component image data, collectively referred to as red, green, blue (RGB) image data. Additionally or alternatively, the image data may be indicated by a luma channel, a gray scale (e.g., gray level), or other color basis.

The image data may be processed to account for one or more physical or digital effects associated with displaying the image data. For example, different display pixels may emit different amounts of light even when supplied the same image data. As such, for a display pixel and/or a group of display pixels (e.g., sub-pixel), uniformity corrections may be done to compensate for the differences. In certain instances, the uniformity correction may be applied in a voltage domain as a voltage offset value. To this end, the image data may be converted from a gray level domain to the voltage domain prior to applying the voltage offset value. In an instance, the image data may be converted based on a first set of lookup tables and a bounding set (e.g., first voltage value, second voltage value) may be determined based on two lookup tables of the first set of look up tables. The voltage offset value may be determined based on an input voltage value, such as from the converted image data, and at least one compensation map. For example, a higher input voltage value may correspond to relatively higher luminance levels for a given frame of image data while lower input voltage values may correspond to relatively low or very low luminance levels. At relatively higher luminance levels, one compensation map may be used to determine the voltage offset value and provide for display pixel uniformity. For example, the compensation map may include a voltage offset value for each display pixel of the electronic display. The voltage offset value may be applied to the image data to generate compensated image data and programmed into the display pixels to display the image on the electronic display. At relatively lower luminance levels, two or more compensation maps may be used to determine the voltage offset value to compensate for a non-linear current-voltage relationship of the display pixel. Indeed, the input voltage value may be interpolated between the two or more compensation maps to determine the voltage offset value and provide for display pixel uniformity. Extrapolation and/or clipping may be used to determine voltage offset values associated with input voltage values outside of the bounding sets. In this way, display pixel (e.g., sub-pixel) uniformity corrections across a wide range of luminance levels in a high dynamic range may be achieved.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, or the like. The input device 14 may include touch-sensing components in the electronic display 12. The touch sensing components may receive user inputs by detecting occurrence or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling light emission from its display pixels based on pixel or image data associated with corresponding image pixels (e.g., points) in the image. In some embodiments, pixel or image data may be generated by an image source, such as the processor core complex 18, a graphics processing unit (GPU), or an image sensor. In certain instances, the image source may receive and store the image data. Additionally, in some embodiments, image data may be received from another electronic device 10, for example, via the network interface 24 and/or an I/O port 16. Similarly, the electronic display 12 may display frames based on pixel or image data generated by the processor core complex 18, or the electronic display 12 may display frames based on pixel or image data received via the network interface 24, an input device, or an I/O port 16.

Figure 2:
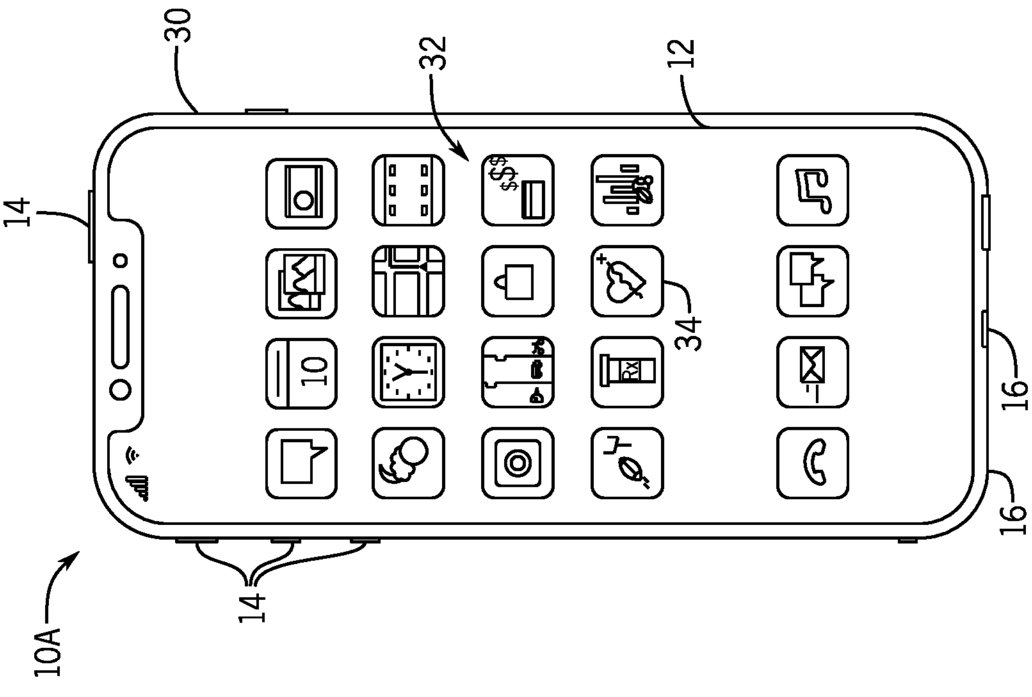
FIG. 2 is an example of the electronic device of FIG. 1 in the form of a handheld device, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smartphone, such as an IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
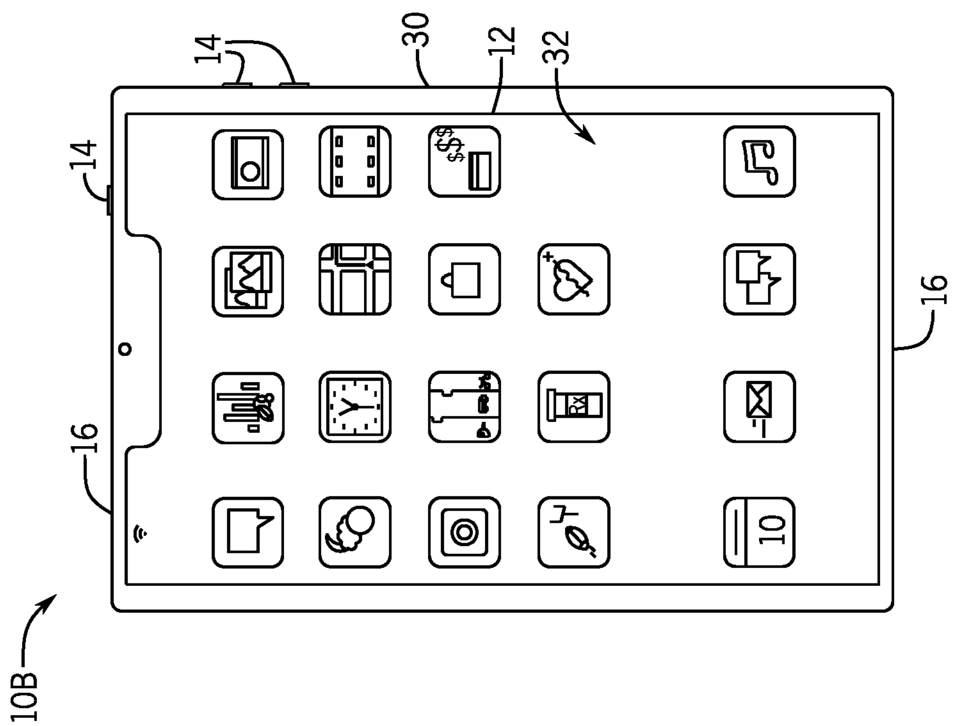
FIG. 3 is an example of the electronic device of FIG. 1 in the form of a tablet device, in accordance with an embodiment.
Figure 4:
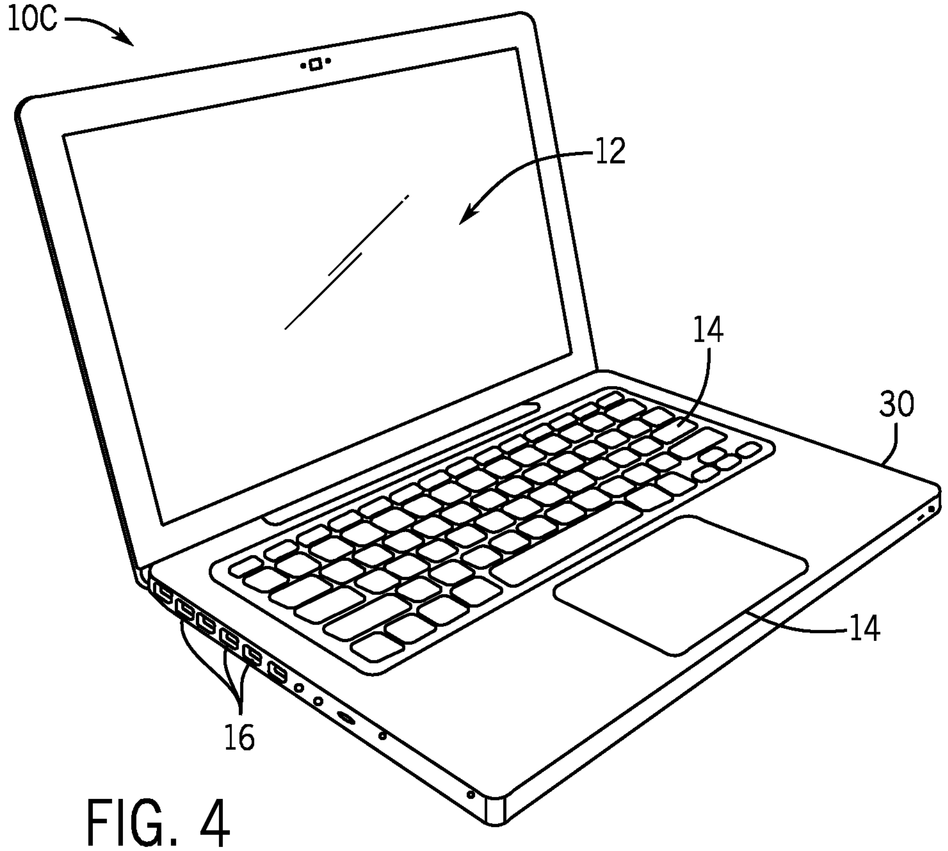
FIG. 4 is an example of the electronic device of FIG. 1 in the form of a notebook computer, in accordance with an embodiment.
Figure 5:
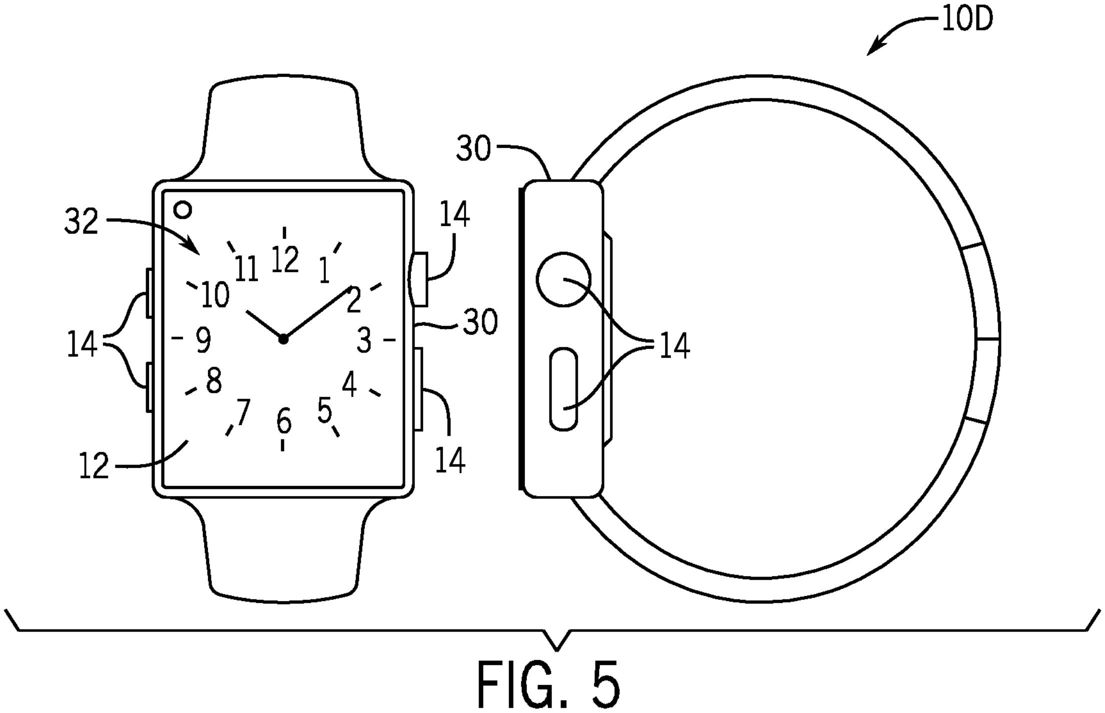
FIG. 5 is an example of the electronic device of FIG. 1 in the form of a wearable device, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
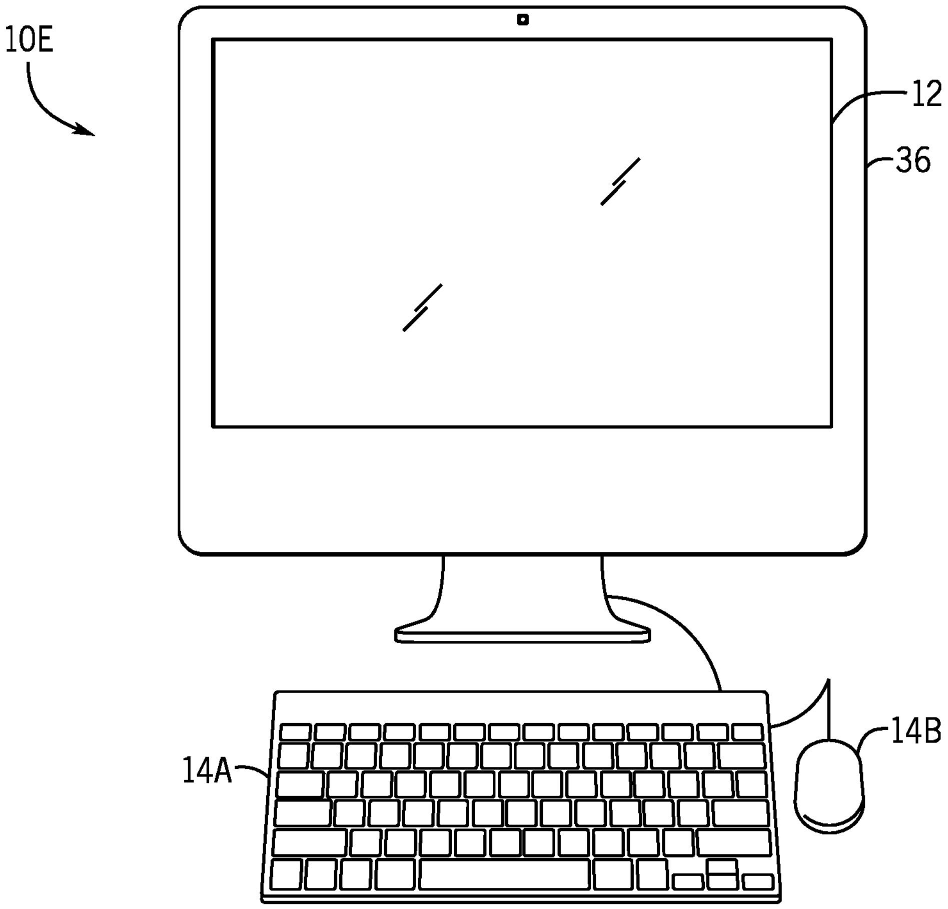
FIG. 6 is an example of the electronic device of FIG. 1 in the form of a desktop computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar devices by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input device(s) 14, such as the keyboard 14A or mouse 14B (e.g., input devices 14), which may connect to the computer 10E.

Figure 7:
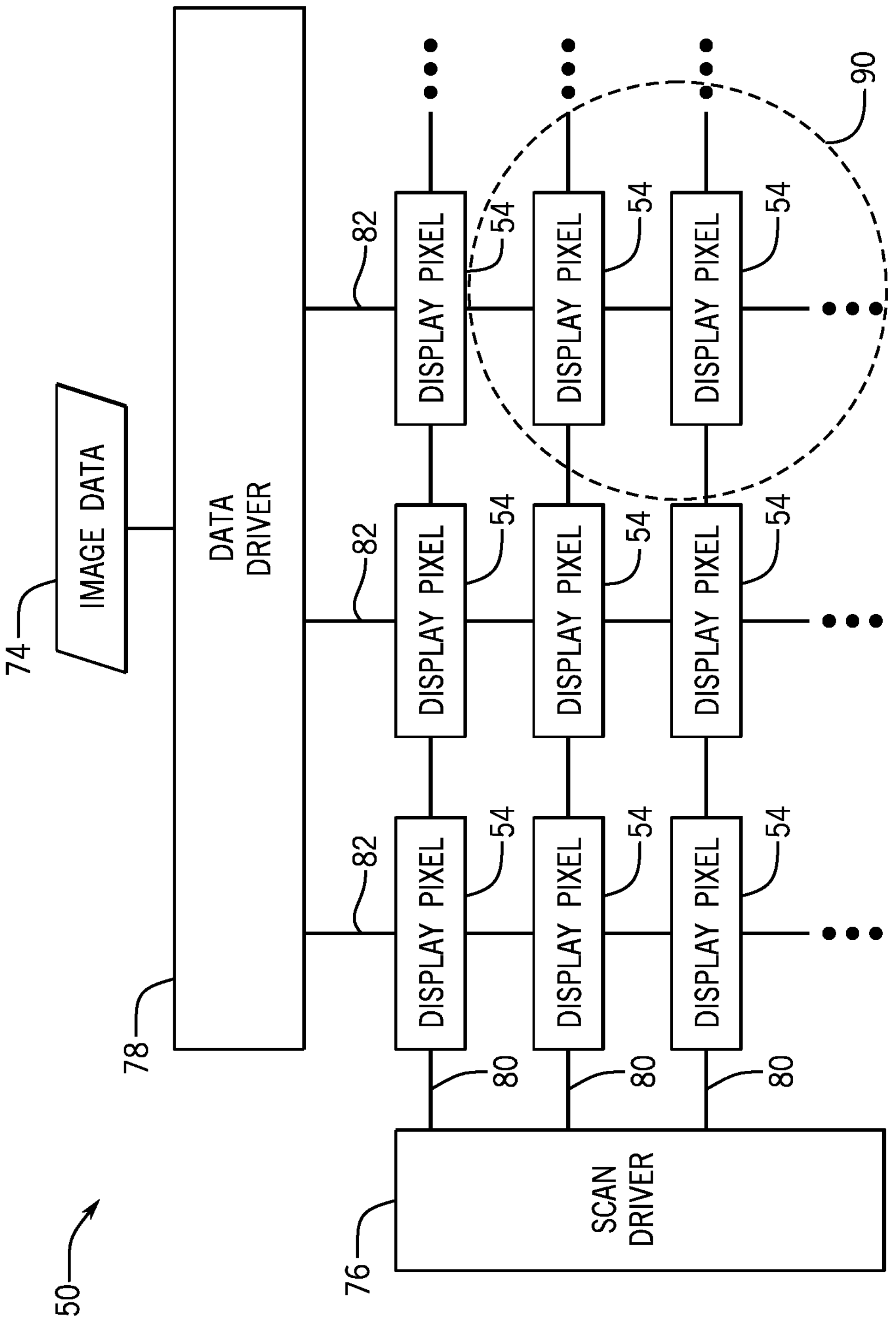
FIG. 7 is a block diagram of a display pixel array of the electronic display of FIG. 1, in accordance with an embodiment.

FIG. 7 is a block diagram of a display pixel array 50 of the electronic display 12. It should be understood that, in an actual implementation, additional or fewer components may be included in the display pixel array 50. The electronic display 12 may receive any suitable image data for presentation on the electronic display 12. The electronic display 12 includes display driver circuitry that includes scan driver circuitry 76 and data driver circuitry 78. The display driver circuitry controls programming the image data 74 into the display pixels 54 for presentation of an image frame via light emitted according to each respective bit of image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)); however, other pixels may be used with the systems and methods described herein including but not limited to liquid-crystal devices (LCDs), digital mirror devices (DMD), or the like. Different display pixels 54 may emit different colors. For example, some of the display pixels 54 may emit red light, some may emit green light, and some may emit blue light. Thus, the display pixels 54 may be driven to emit light at different brightness levels (e.g., luminance levels) to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others. The display pixels may represent sub-pixels that each control a luminance value of one color component.

The scan driver circuitry 76 may provide scan signals (e.g., pixel reset, data enable, on-bias stress, emission (EM)) on scan lines 80 to control the display pixels 54 by row. For example, the scan driver circuitry 76 may cause a row of the display pixels 54 to become enabled to receive a portion of the image data 74 from data lines 82 from the data driver circuitry 78. In this way, an image frame of the compensated image data 74 may be programmed onto the display pixels 54 row by row. Other examples of the electronic display 12 may program the display pixels 54 in groups other than by row. When the scan driver circuitry 76 provides an emission signal to certain pixels 54, those pixels 54 may emit light according to the image data 74 with which those pixels 54 were programmed.

Figure 8:
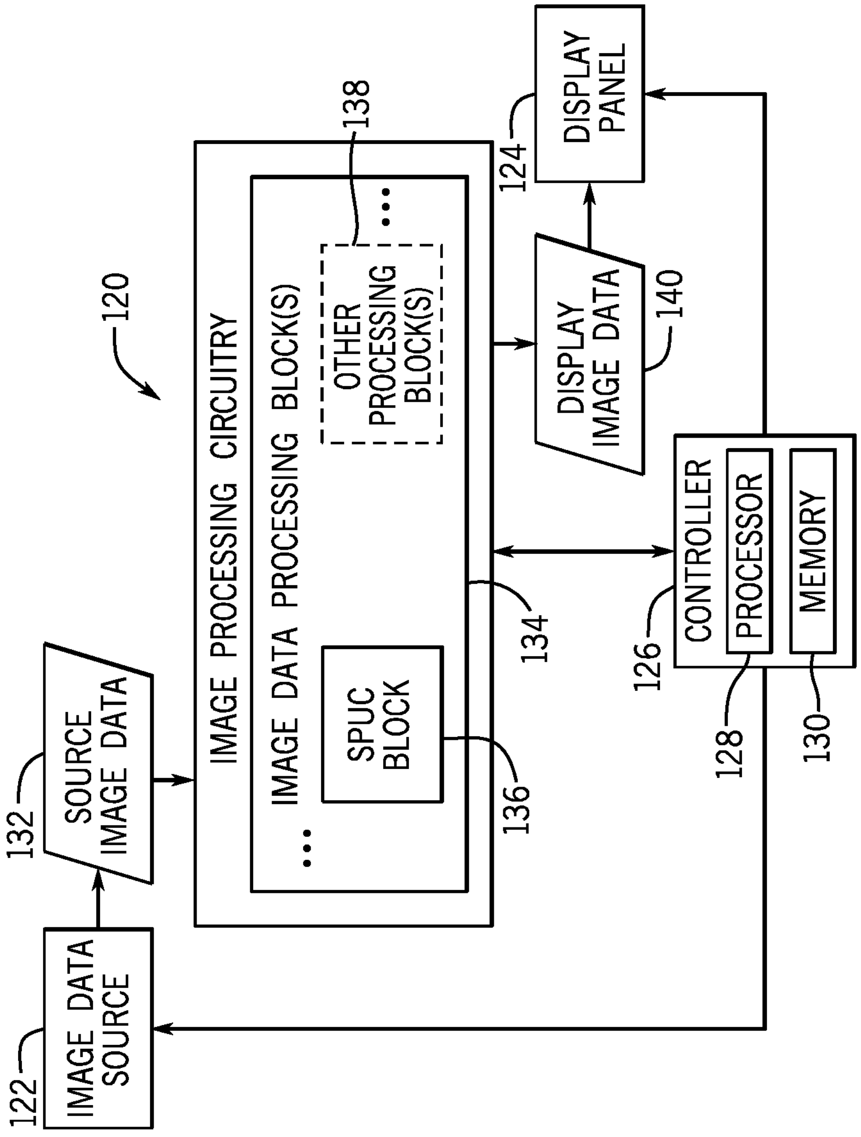
FIG. 8 is a block diagram of the electronic display of FIG. 1 include a sub-pixel uniformity compensation (SPUC) block, in accordance with an embodiment.

With the foregoing in mind, FIG. 8 illustrates image processing circuitry 120 that may receive image data and apply a compensation to the image data for display pixel 54 (e.g., sub-pixel) uniformity. The image processing circuitry 120 may be implemented in the electronic device 10, in the electronic display 12, or a combination thereof. For example, the image processing circuitry 120 may be included in the processor core complex 18, a timing controller (TCON) in the electronic display 12, or any combination thereof. As should be appreciated, although image processing is discussed herein as being performed via a number of image data processing blocks, embodiments may include general purpose and/or dedicated hardware or software components to carry out the techniques discussed herein.

The electronic device 10 may also include an image data source 122, a display panel 124, and/or a controller 126 in communication with the image processing circuitry 120. In some embodiments, the display panel 124 of the electronic display 12 may be a reflective technology display, a liquid crystal display (LCD), or any other suitable type of display panel 124. In some embodiments, the controller 126 may control operation of the image processing circuitry 120, the image data source 122, and/or the display panel 124. To facilitate controlling operation, the controller 126 may include a controller processor 128 and/or controller memory 130. In some embodiments, the controller processor 128 may be included in the processor core complex 18, the image processing circuitry 120, a timing controller in the electronic display 12, a separate processing module, or any combination thereof and execute instructions stored in the controller memory 130. Additionally, in some embodiments, the controller memory 130 may be included in the local memory 20, the main memory storage device 22, a separate tangible, non-transitory, computer-readable medium, or any combination thereof.

The image processing circuitry 120 may receive source image data 132 corresponding to a desired image to be displayed on the electronic display 12 from the image data source 122. In certain instances, the image data source 122 may generate or receive image data, such as the source image data 132, and store the image data until transmission. The source image data 132 may indicate target characteristics (e.g., pixel data) corresponding to the desired image using any suitable source format, such as an RGB format, an αRGB format, a YCbCr format, and/or the like. Moreover, the source image data 132 may be fixed or floating point and be of any suitable bit-depth. Furthermore, the source image data 132 may reside in a linear color space, a gamma-corrected color space, a gray level space, or any other suitable color space. As used herein, pixels or pixel data may refer to a grouping of sub-pixels (e.g., individual color component pixels such as red, green, and blue) or the sub-pixels themselves.

As described above, the image processing circuitry 120 may operate to process source image data 132 received from the image data source 122. The image data source 122 may include captured images from cameras, images stored in memory, graphics generated by the processor core complex 18, or a combination thereof. Additionally, the image processing circuitry 120 may include one or more sets of image data processing blocks 134 (e.g., circuitry, modules, or processing stages) such as a sub-pixel uniformity correction (SPUC) block 136. As should be appreciated, multiple other processing blocks 138 may also be incorporated into the image processing circuitry 120, such as a color management block, a dither block, a pixel contrast control (PCC) block, a burn-in compensation (BIC) block, a scaling/rotation block, a panel response correction (PRC) block, and the like, before and/or after the SPUC block 136. The image data processing blocks 138 may receive and process source image data 132 and output display image data 140 in a format (e.g., digital format and/or resolution) interpretable by the display panel 124. Further, the functions (e.g., operations) performed by the image processing circuitry 120 may be divided between various image data processing blocks 138, and, while the term "block" is used herein, there may or may not be a logical or physical separation between the image data processing blocks 138. The uniformity compensation data may be calculated based on one or more compensation maps generated from panel uniformity calibration, and the compensation maps may be stored in the memory 130. For example, the compensation maps may be compressed and stored as a frame buffer.

In some embodiments, uniformity compensation may be provided by the SPUC block 136 during display operations of the electronic display 12. As discussed above, the display pixels 54 may emit an amount of light (e.g., luminance level) according to image data with which the display pixels 54 were programmed. In certain instances, the display pixels 54 may emit light at a different level than a target level indicated in the source image data 132. For example, manufacturing tolerances may result in certain display pixels 54 emitting more or less light than other display pixels 54 even when supplied the same source image data 132. In another example, variations in manufacturing of the display pixels 54 may result emissions of the display pixel 54 being relatively brighter or relatively darker than other display pixels 54 when supplied the same source image data 132. To compensate for display pixel non-uniformity, the SPUC block 136 may apply a compensation (e.g., voltage compensation) to the source image data 132 prior to programming the display pixels 54. To this end, the SPUC block 136 may receive and convert the source image data 132 from a gray level domain to a voltage domain. In certain instances, the SPUC block 136 may determine an input voltage value from the converted source image data 132 to determine a brightness level of the frame of image data to be displayed. In other instances, the SPUC block 136 may determine a brightness level of the current frame of image data being displayed on the electronic display 12. Based on the brightness level, the SPUC block 136 may determine a number of compensation maps to retrieve from the memory 130.

By way of example, the memory 130 may store three compensation maps that may be fully programmable with input voltage values. The compensation map may receive an input voltage value and determine a voltage offset value to be applied to the source image data 132 for a display pixel 54 and/or a group of display pixels 54. To this end, the compensation maps may hold gain values for a bit-depth of each color component. As discussed herein, the current-voltage relationship of the display pixel 54 may be non-linear at low luminance levels. As such, the voltage offset value for achieving display pixel uniformity may vary as a function of display pixel luminance. For example, at relatively higher luminance levels, the SPUC block 136 may retrieve one compensation map and determine the voltage offset based on the one compensation map 176 to generate the display image data 140. At relatively lower luminance levels, the SPUC block 136 may retrieve two or more compensation maps account for a non-linear current-voltage relationship of the display pixels 54. The SPUC block 136 may interpolate between compensation maps determine the voltage offset value. Indeed, the display image data 140 may be compensated for display pixel 54 non-uniformity. Programming the display pixels 54 with the display image data 140 may cause the respective display pixel to emit an amount of light at the target level indicated in the source image data 132 and/or according to compensated gray levels as indicated in the display image data 140.

Figure 9:
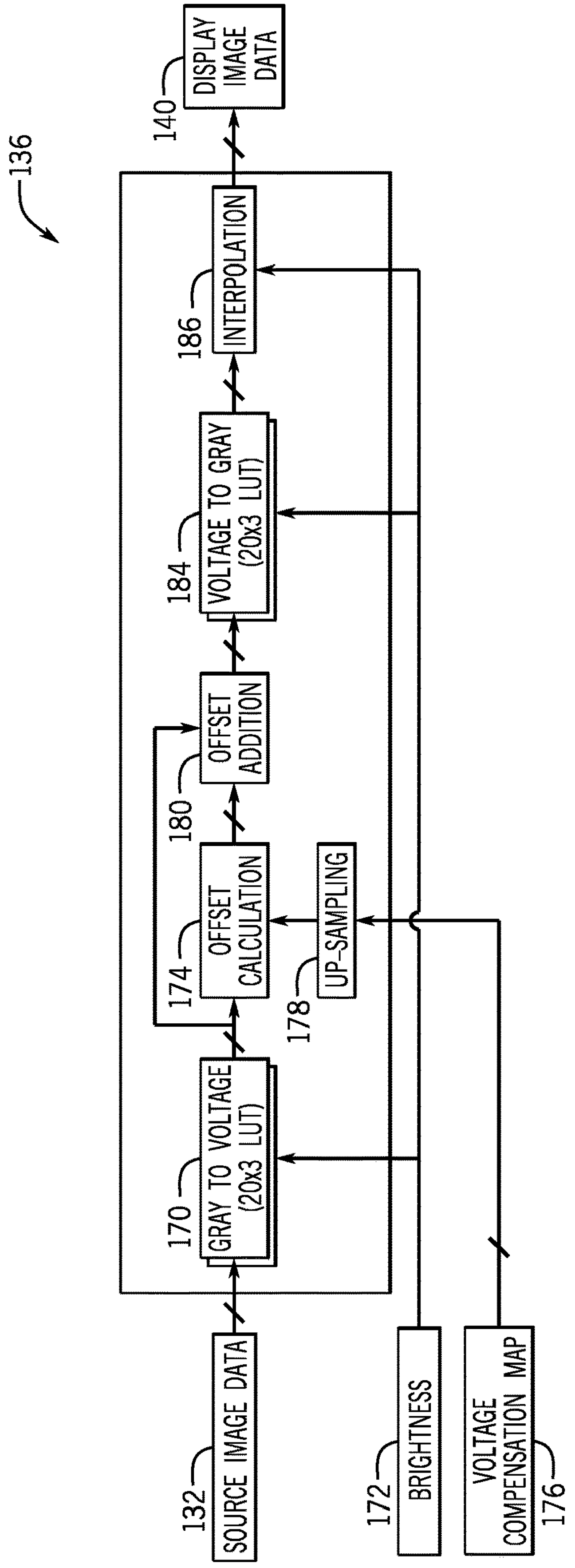
FIG. 9 is a block diagram of the SPUC block of FIG. 8, in accordance with an embodiment.

FIG. 9 illustrates the SPUC block 136 implemented within the image processing circuitry 120 of the electronic device 10 of FIG. 1. As discussed herein, the SPUC block 136 may receive the source image data 132 (e.g., gray level) from the image data source 122. For example, the image data source 122 may be a panel response correction (PRC) block that outputs the source image data 132. The source image data 132 may include a number of bits per component (bpc), such as 8 bpc, 9 bpc, 10 bpc, 11 bpc, 12 bpc, 13 bpc, 14 bpc, and so on. However the source image data 132 may include any suitable number of bits.

In certain instances, the equivalent voltage value may be dependent on a brightness level (e.g., display brightness level) for a current frame displayed on the electronic display 12. To this end, a sensor may be disposed beneath a display pixel of the electronic display 12 (e.g., to measure luminance levels, ambient light, display brightness, brightness levels). For example, the sensor may be an ambient light sensor that measures an amount of ambient light hitting the electronic display 12. The sensor may transmit an indication of the brightness level to the SPUC block 136 prior to the uniformity compensation.

The uniformity compensation may be applied in the voltage domain, so the display pixel values of the source image data 132 may be converted to equivalent voltage values. The SPUC block 136 may convert the source image data 132 from a gray level domain to a voltage domain using conversion circuitry (e.g., data structure, conversion block, look-up table). For example, a first set of look-up tables 170 (LUTs) may be gray level to voltage value look-up tables that depend on a brightness level 172. The first set of LUTs 170 may include conversions between other operating characteristics of the electronic display 12, such as current, power, brightness, and the like. The brightness level 172 may be determined by the processor core complex 18 based on ambient light levels obtained by the sensor.

Additionally or alternatively, the SPUC block 136 may define an active region of the electronic display 12 to apply the uniformity compensation. For example, the active region may be all or a portion of the electronic display 12 to which the compensation may be applied. For example, the active region may be a portion of the electronic display 12, such as 30×30 display pixels, 100×50 display pixels, 600×1000 display pixels, 700×2000 display pixels, and so on. In another example, the active region may be an entirety of the electronic display 12. In an instance, the SPUC block 136 may not apply a compensation to the source image data 132 associated with display pixels 54 located outside of the active region. In other instances, the SPUC block 136 may not apply a compensation to the source image data 132, such as when the SPUC data path may be inactive or disabled which may save power and/or reduce processing time.

Returning to the first set of LUTs 170 (e.g., gray level to voltage value LUT), each of the LUTs may be indexed by gray level and brightness level. The first set of LUTs 170 may include multiple entries (e.g., 2, 4, 6, 8, 10, 20, 30) per color component and a subset of entries (e.g., 2, 4, 6, 8, 10) may be fully programmable (e.g., coordinate, value). By way of example, a first LUT of the first set of LUTs 170 may include twenty entries per color component and eighteen entries may be fully programmable (e.g., coordinate, value). For example, a first coordinate may be zero. Step values within each of the first set of LUTs 170 may be divided to support linear interpolation between LUT entries and/or LUT coordinates. As discussed herein, the conversion from gray level to voltage values (e.g., voltage data) may depend on the brightness level 172. As brightness level 172 for a given frame remains constant, two LUTs of the first set of LUTs 170 may be programmed according to the brightness level 172 (e.g., by the image processing circuitry 120). The two programmed LUTs may include a first LUT may include a lower bounding brightness level and a second LUT may include a higher bounding brightness level. For example, the present brightness level 172 may correspond to 150 nits, the first LUT may correspond to 100 nits, and the second LUT may correspond to 200 nits, forming a bounding set around the present brightness level 172. As will be discussed further below, this may allow for a more precise determination of a voltage offset value. In certain instances, the SPUC block 136 may select the two LUTs from the first set of LUTs based on the brightness level 172.

In this way, the voltage value(s) (e.g., voltage data) may be determined based on the two programmed LUTs 170 and the source image data 132 (e.g., gray level of the display pixel, input voltage value). For example, the first LUT may be used to determine a first voltage value (e.g., low voltage value) and the second LUT may be used to determine a second voltage value (e.g., high voltage value). The first voltage value and the second voltage value may include any number of bits per component (e.g., 8 bpc, 9 bpc, 10 bpc, 13 bpc, 16 bpc, 19 bpc); however, the voltage values may include any suitable number of bits per component. The voltage values may also include analog voltage states. In certain instances, voltage values within the source image data 132 outside of the two programmed LUTs 170 may be clipped to a nearest LUT 170 of the two programmed LUTs 170.

At an offset calculation block 174, one or more voltage offset value(s) may be determined and added to the first voltage value and the second voltage value to generate a first compensated voltage value and a second compensated voltage value, respectively. As discussed herein, one or more compensation maps 176 may be retrieved from the memory 130 to determine the one or more voltage offset value(s). In particular, the compensation map 176 may contain compensation data (e.g., voltage compensation data, voltage offset value) for each display pixel 54 of the electronic display 12. The compensation maps 176 may be generated at manufacture of the electronic display 12. For example, a camera may capture calibration image data of the display pixels 54 to measure display pixel non-uniformity. The camera may detect luminance measurements for the display pixels 54 in the calibration image data and determine display pixel 54 offset values for achieving sub-pixel uniformity. Additionally or alternatively, the compensation maps 176 may be programmed based on input voltage values from the source image data 132. For example, each of the compensation maps 176 may include a voltage offset value associated with an input voltage value. The input voltage values may be fully programmable and independently defined per channel. Step values of the compensation maps 176 may be divided such that linear interpolation between voltage offset entries and/or input voltage values may be supported. Each compensation map 176 may include any suitable number of bits per component (e.g., 8 bpc, 10 bpc, 12 bpc, 14 bpc, 16 bpc), which may include an additional sign bit.

A number of the compensation maps 176 may be determined based on the brightness level 172 to provide for display pixel uniformity corrections across a wide range of luminance in a high dynamic range. By way of example, one compensation map 176 may be used when the brightness level 172 may be above a first brightness threshold (e.g., threshold brightness level) and two or more compensation maps 176 may be used when the brightness level 172 may be below the first brightness threshold. When two or more compensation maps 176 may be used, interpolation, extrapolation, clipping, or a combination thereof may be used to determine the voltage offset value.

To reduce a size of the compensation map 176, the maps 176 may be stored as a compressed frame buffer in the memory 130. For improved compression efficiency, the compensation maps 176 may be incremented to 4096 bits prior to compression. For example, the compensation map 176 may be compressed using a lossy or lossless compression algorithm with a compression ratio of 2:1, 4:1, and so on. The compensation map 176 may be compressed to a number of bits per component (e.g., 8 bpc, 10 bpc, 13 bpc, 15 bpc, 17 bpc) and stored within the memory 130. In certain instances, each color component (e.g., red, green, blue) may be stored using a 128×1 tile, which may be interleaved to form the compensation map 176. For example, a panel type of red, green, and blue (RGB), the tiles may be interleaved as red first, green second, and blue third.

An up-sampling block 178 may decompress (e.g., up-sample) the compensation map 176 to support interpolation between two or more compensation maps 176. For example, the compensation maps 176 may be decompressed using a bilinear interpolation method, a spatial interpolation method, a nearest neighbor interpolation method, or the like. By way of example, the compensation map 176 may be decompressed based on a column by column basis then by a row by row basis (e.g., nearest neighbor interpolation). Additionally or alternatively, a size of the compensation map 176 may be determined by the size of the active region, discussed above. For example, after interleaving the tiles, the compensation map 176 may be down-sampled by a factor of two or four to match (or substantially match) the size of the active region.

Figure 10:
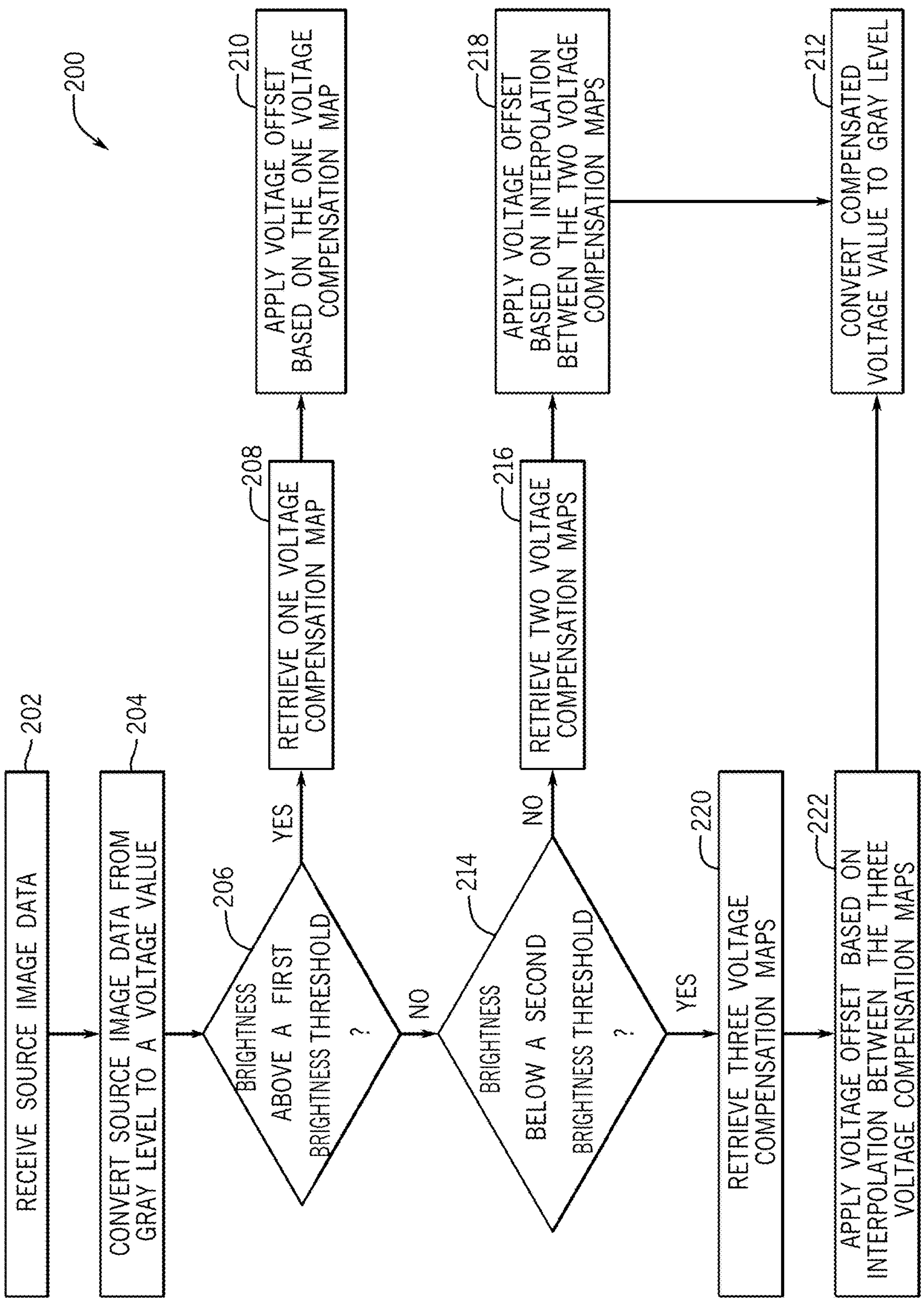
FIG. 10 is a flowchart of a process or method for determining a number of compensation maps and generating compensated image data based on the compensation maps, in accordance with an embodiment.

As further discussed with respect to FIG. 10, up to three compensation maps 176 may be used to determine the one or more voltage offset value(s). For example, at an offset addition block 180, a first voltage offset value and a second voltage offset may be individually determined based on the up to three compensation maps 176. For example, the first voltage offset value and/or the second voltage offset value may be determined based on interpolation or extrapolation between the up to three compensation maps 176 and the input voltage value. In an instance, the first voltage offset value and the second voltage offset value may be left bit-shifted by any suitable number of bits (e.g., 8 bpc, 10 bpc, 15 bpc, 17 bpc, 19 bpc) to align with the voltage values. In other instances, the first voltage offset value and the second voltage offset value may be least significant bit-shift (LSB) aligned. As such, the first voltage offset value may be added to the first voltage value to generate the compensated first voltage value and the second voltage offset value may be added to the second voltage value to generate the compensated second voltage value. After the re-alignment and addition, the compensated first voltage value and the compensated second voltage value may include any suitable number of bits per component (e.g., 8 bpc, 10 bpc, 15 bpc, 17 bpc, 19 bpc).

The compensated first voltage value and compensated second voltage value may be received by second conversion circuitry (e.g., data structure, lookup table), such as a second set of LUTs 184 (e.g., voltage value to gray level) and converted from the voltage domain back to the gray level domain for programming into the display pixels 54. For example, each LUT of the second set of LUTs 184 may be indexed by voltage value and brightness level. Each of the second set of LUTs 184 may include any suitable number of entries per color component (e.g., 2, 4, 6, 8, 10, 20, 30) and a subset of the entries (e.g., 2, 4, 6, 8, 10) may be fully programmable (e.g., coordinate, value). For example, a first LUT of the second set of LUTs 184 may include twenty entries per color component and eighteen entries may be fully programmable Each of the second set of LUTs 184 may include step values to support linear interpolation between LUT entries and coordinates. Step values within the LUT may be specified as 0.28 values while each LUT entries may be 0.14 values. As such, interpolation for intermediate voltage values may be supported. Although the second set of LUTs 184 include gray level to voltage conversion in the illustrated example, the second set of LUTs 184 may include any suitable operating characteristics, such as current and power.

In certain instances, the second set of LUTs 184 may convert the voltage value to gray level based on one or more display brightness values (e.g., brightness level 172). As display brightness level 172 may remain constant for a frame of image data, two LUTs 184 that are programmed according to the current display brightness level. Brightness values outside of the minimum and maximum levels corresponding to the second set of LUTs 184 may be clipped to the nearest LUT of the second set of LUTs 184. As such, the second set of LUTs 184 may be used to convert the compensated first voltage value and the second compensated voltage value to a first compensated gray level and a second compensated gray level.

At an interpolation block 186, the gray level equivalents of the compensated first voltage value and the compensated second voltage value may be received and an interpolated gray level may be determined. That is, the interpolated gray level may be determined based on the first compensated gray level and the second compensated gray level. The interpolated gray level may include any suitable number of bits per component (e.g., 10 bpc, 12 bpc, 14 bpc, 16 bpc, 18 bpc). The display image data 140 may include an interpolated gray level value for each display pixel 54 of the electronic display 12. The display image data 140 may be programmed into the display pixels 54 to cause each respective display pixel 54 to illuminate according to the interpolated gray level value. In this way, the SPUC block 136 may provide for display pixel uniformity across a wide range of luminance in a high dynamic range.

With the foregoing in mind, FIG. 10 illustrates a flowchart of a method 200 for determining a number of compensation maps 176 to retrieve from the memory 130 and generating the display image data 140. At block 202, the SPUC block 136 may receive source image data 132. For example, the image data source 122 may generate and transmit the source image data 132 to the SPUC block 136. The received source image data 132 may be in the gray level domain. To apply compensation to the source image data 132, the SPUC block 136 may convert the source image data 132 from gray level to voltage value, at block 204. For example, the SPUC block 136 may utilize the first set of LUTs 170 (e.g., gray level to voltage value LUTs) to convert the source image data 132 from gray levels to the voltage values. The first set of LUTs 170 may be dependent on the brightness level 172, which may be constant for a frame of image data. As such, the SPUC block 136 may determine a bounding set based on a first LUT of the first set of LUTs 170 to determine a first voltage value and a second LUT of the first set of LUTs 170 to determine a second voltage value.

At decision block 206, the SPUC block 136 may determine if the brightness level 172 is above a first brightness threshold. For example, the SPUC block 136 may receive an indication of the brightness level 172 from a sensor or sensing circuitry and compare the brightness level 172 to a first brightness threshold. The brightness level 172 may be the brightness of the display panel 124 or an amount of light being emitted by the display pixel 54. The first brightness threshold may be any suitable brightness value programmed by a user or determined by the SPUC block 136. For example, the brightness threshold may be 50 nits, 100 nits, 150 nots, 200 nits, and so on. The SPUC block 136 may determine if the brightness level 172 may be greater than the first brightness threshold.

If the brightness level 172 is above the first brightness threshold, then the SPUC block 136 may retrieve one compensation map 176 at block 208. The SPUC block 136 may retrieve the compensation map 176 from the memory 130 of the controller 126. The retrieved compensation map 176 may include a voltage offset value for each display pixel 54 of the electronic display 12 based on a particular input voltage value (e.g., from the source image data 132). As discussed herein, the SPUC block 136 may determine a first voltage offset value for a first voltage value and a second voltage offset value for a second voltage value.

At block 210, the SPUC block 136 may apply a compensation based on the one compensation map 176. For example, the SPUC block 136 may determine the first voltage offset value and the second voltage offset value based on the one compensation map 176. The SPUC block 136 may apply the first voltage offset value to the first voltage value and the second voltage offset value to the second voltage offset value. As such, the source image data 132 for each display pixel 54 of the electronic display 12 to generate a compensated voltage value, such as the compensated first voltage value and/or the compensated second voltage value.

At block 212, the SPUC block 136 may convert the compensated voltage values to gray level (e.g., display image data 140). The SPUC block 136 may utilize the second set of LUTs 184 to convert from the voltage domain back to the gray level domain. For example, the SPUC block 136 may utilize a first LUT of the second set of LUTs 184 (e.g., voltage value to gray level LUTs) to convert the first compensated voltage value to a first compensated gray level and a second LUT of the second set of LUTs 184 to convert the second compensated voltage value to a second compensated gray level. The SPUC block 136 may interpolate between the first compensated gray level and the second compensated gray level to determine the compensated gray level used to program into the display pixels 54. The compensated gray level from the display image data 140 that may be programmed into a respective display pixels 54 to provide for display pixel uniformity.

If the brightness level 172 is not above the first brightness threshold, then the SPUC block 136 may determine if the brightness level 172 is less than a second brightness threshold, at block 214. For example, if the brightness level 172 is below the first threshold brightness, then using two or more compensation maps 176 may provide improved compensation for display pixel uniformity across a wider range of luminance in comparison to using one compensation map 176. That is, at lower luminance levels, the brightness-to data (e.g., brightness-to-voltage) relationship of the display pixel 54 may be non-linear and interpolating between two or more compensation maps 176 may provide an increased range of brightness values and/or increased range of voltage offset values. To compensate for the non-linearity, each of the compensation maps 176 may be programmed to different input voltage values and interpolation between the voltage values and/or the compensation maps 176 may provide the voltage offset value. In another example, a bounding set may be determined based on the compensation maps 176 and input voltage values outside of the bounding sets may be extrapolated or clipped to a nearest compensation map 176. In this way, the voltage offset value determined from two or more compensation maps 176 may be improved in comparison to the voltage offset value determined from the one compensation map 176. In certain instances, two or more compensation maps 176 may be used if the brightness level is below a first brightness threshold, such as 100 nits.

If the brightness level 172 is not below the second brightness threshold, then at block 216, the SPUC block 136 may retrieve two compensation maps 176. At block 218, the SPUC block 136 may apply the voltage offset values based on interpolation between the two compensation maps 176. For example, a bounding set (e.g., minimum voltage value, maximum voltage value) may be determined based on the two retrieved compensation maps 176. If the input voltage value is within the bounding set, the interpolation may be used to determine the voltage offset value associated with the input voltage value. In certain instances, the input voltage value may be outside (e.g., greater than, less than) of the bounding set. As further described with respect to FIGS. 12 and 13, extrapolation from a nearest compensation map 176 or clipping to the nearest compensation map 176 may be used to determine the voltage offset value. As such, the voltage offset value may be determined using two compensation maps 176. The SPUC block 136 may apply the compensation to the source image data 132 to generate the compensated voltage value. The method 200 may then proceed to block 212 and the SPUC block 136 may convert the compensated voltage value to a gray level (e.g., display image data 140), interpolate between the first compensated gray level and the second compensated gray level, and generate the compensated gray level used to program the display pixels 54.

If the brightness level 172 is less than the second brightness threshold, then at block 220, the SPUC block 136 may retrieve three compensation maps 176. For example, the SPUC block 136 may retrieve three compensation maps 176 from the memory 130 of the controller 126. At block 222, the SPUC block 136 may apply the voltage offset based on interpolation between the three compensation maps 176. As discussed herein, a bounding set may be determined based on the input voltages of the three compensation maps 176. Indeed, one or more bounding sets may be determined based on the three compensation maps 176 and a voltage offset value associated with input voltage values within the bounding sets may be determined based on interpolation. For example, interpolation between the compensation maps 176 may be used to determine the voltage offset value. In another example, interpolation between entries and/or coordinates of one compensation map 176 may be used to determine the voltage offset value. As further described with respect to FIGS. 14 and 15, input voltage values outside of the bounding set may be determined by extrapolating to a nearest compensation map 176 or clipping to a nearest compensation map 176. The SPUC block 136 may compensate the source image data 132 with the voltage offset value to generate the display image data 140. The method 200 may then proceed to block 212 and the SPUC block 136 may convert the compensated voltage value to a gray level (e.g., display image data 140), interpolate between the first compensated gray level and the second compensated gray level, and generate the interpolated gray level used to program the display pixels 54.

While the method 200 described steps in a certain order, it should be noted that the method 200 may be performed in an order that differs from the order described above and certain steps may be skipped or may not be performed altogether. The method 200 may also be performed by the image processing circuitry 120, the processor core complex 18, or the like. The method 200 may be applied to different operating characteristics of the electronic display 12, such as current, voltage, power, and the like. For example, the SPUC block 136 may determine if the input voltage value is above a threshold voltage. The threshold voltage may be any suitable value programmed by a user or determined by the SPUC block 136. If the input voltage is above the threshold voltage, then the SPUC block 136 may retrieve one compensation map 176 and determine the one or more voltage offset value(s) based on the one compensation map 176. If the input voltage is below the threshold voltage and above a second threshold voltage, then the SPUC block 136 may retrieve two compensation maps 176 for determining the one or more voltage offset value(s). If the input voltage is below the second threshold voltage, then the SPUC block 136 may retrieve three compensation maps 176. Additionally or alternatively, at higher luminance levels, a greater amount of voltage may be applied to cause a perceivable change in luminance. That is, slight variations in voltage values may not cause a perceivable change in luminance.

FIG. 11 illustrates a graph 250 of determining a voltage offset value using one compensation map 176, which may be the first voltage offset value or the second voltage offset value. As discussed herein, one compensation map 176 may be used when the brightness level 172 of the electronic display 12 is above a first brightness threshold. For example, the compensation map 176 may include voltage offset values for each display pixel 54 based on calibration mapping. In another example, the compensation map 176 may include one or more input voltage values associated with one or more voltage offset values. As such, the SPUC block 136 may receive the source image data 132 with input voltage values for each display pixel 54 and use the compensation map 176 to determine the voltage offset value for each input voltage value. The voltage offset values from the compensation map 176 may be applied to the source image data 132 to provide for sub-pixel uniformity.

As illustrated by the graph 250, a voltage offset value 252 may be associated with an input voltage value 254. The line 258 illustrates a constant relationship between the voltage offset value 252 and the input voltage value 254. Indeed, one voltage offset value 252 may be applied regardless of the input voltage values 254 of the source image data 132. For a given frame of image data, a constant voltage offset may be applied an input voltage value may correspond to a voltage offset value. Indeed, the SPUC block 136 may query the compensation map 176 at the input voltage value 254 to determine the voltage offset value 252. The SPUC block 136 may apply the queried voltage offset value 252 to the source image data 132 to generate the display image data 140.

FIG. 12 illustrates a graph 270 of determining a voltage offset value using two compensation maps 176 and extrapolating to a nearest compensation map 176. For example, two compensation maps 176 may be retrieved when the brightness level 172 may be below a first brightness threshold and above a second brightness threshold. For example, two compensation maps may be retrieved when the brightness level 172 may be between 15 and 100 nits to provide for display pixel uniformity. Based on input voltage values, two bounding sets, if available, may be determined and an interpolated voltage offset value may be computed using each of the two bounding sets based on the input voltage value of the display pixel 54.

With the foregoing in mind, the graph 270 illustrates a voltage offset value 252 over an input voltage value 254 (e.g., voltage values of the source image data 132). As illustrated by the graph 270, one bounding set may be determined based on the input voltage 254. As discussed herein, each of the compensation maps 176 may be programmed with input voltage values and the bounding sets may be defined based on a maximum input voltage value and a minimum input voltage value programmed into the compensation maps 176. For example, a first compensation map 176 may include higher input voltage values in comparison to a second compensation map 176. As such, the maximum input voltage value may be equivalent to an absolute maximum input voltage value programmed into the first compensation map 176 and a minimum input voltage value may be equivalent to an absolute minimum input voltage value programmed into the second compensation map 176. Indeed, input voltage values outside of the bounding set may be extrapolated to a nearest compensation map 176. For example, to determine a voltage offset value associated with an input voltage value less than the minimum input voltage value, the SPUC block 136 may extrapolate from the second compensation map 176. In another example, to determine voltage offsets associated with input voltage values greater than maximum voltage value, the SPUC block 136 may extrapolate from the first compensation map 176. Additionally or alternatively, the SPUC block 136 may determine the voltage offset value for both the low voltage value and the high voltage values outputted by the first set of LUTs 170.

With the foregoing in mind, the graph 270 illustrates two points 272 and 274, a line segment 276 between the points 272 and 274, and two line segments extending from the points 272 and 274. For example, points 272 and 274 may define the bounding set. The point 272 may illustrate the upper input voltage value (e.g., maximum input voltage value) and the point 274 may illustrate the lower input voltage value (e.g., minimum input voltage value). To determine the voltage offset values 252 for input voltage values 254 between the points 272 and 274, interpolation may be used. As illustrated by line segment 276, a linear interpolation between the points 272 and 274 may be performed and corresponding voltage offset values 252 may be determined based on the line segment 276. In certain instances, the point 272 may be associated with a first compensation map 176 and the point 274 may be associated with a second compensation map. As such, the line segment 276 may represent linear interpolation between the two compensation maps 176. Additionally or alternatively, the line segment 276 may represent linear interpolation between two or more entries of one compensation map 176. Indeed, the compensation maps 176 may be programmed to support linear interpolation between entries or coordinates of one compensation map 176 and/or between two or more compensation maps 176. Although the illustrated example uses linear interpolation, in certain embodiments, non-linear interpolation may also be supported. To this end, the compensation maps 176 may be fully programmable with entries, coordinates, and step values To determine voltage offset values 252 associated with input voltage values 254 outside of the bounding, extrapolation to a nearest compensation map 176 may be used. Indeed, a first compensation map 176 may be programmed with higher input voltage values in comparison to a second compensation map 176. As such, input voltage values 254 above the point 274 may be extrapolated from the point 274 and/or from the first compensation map 176 to determine the voltage offset value 252 and input values 254 below the point 272 may be extrapolated from the point 274 and/or the second compensation map 176. Line segment 278 illustrates a linear extrapolation from the point 272 to determine voltage offset values 252 associated with input voltage values 254 less than the lower input voltage value and line segment 280 illustrates a linear extrapolation from the point 274 for input voltage values 254 greater than the upper input voltage value. As such, voltage offset values 254 associated with input voltage values 254 outside of the bounding set may be determined using linear extrapolation from a nearest compensation map 176.

Figure 13:
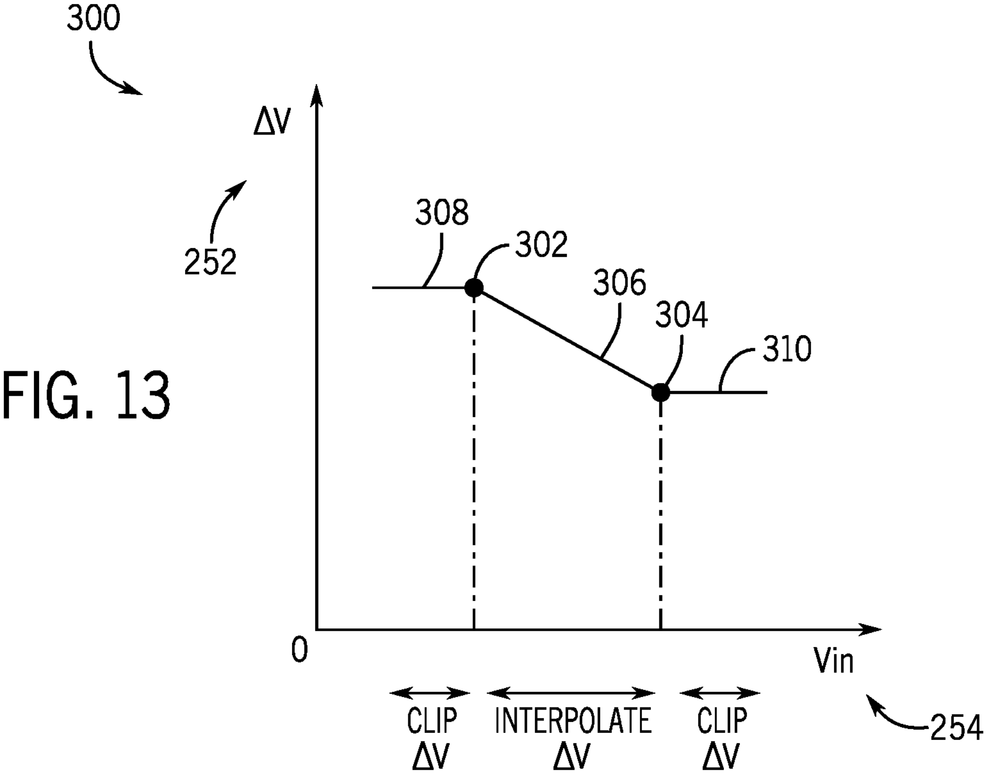
FIG. 13 is a graphical representation of determining a uniformity compensation using two compensation maps and clipping to a nearest compensation map, in accordance with an embodiment.

FIG. 13 illustrates a graph 300 of determining a voltage offset value using two compensation map 176 and clipping to a nearest compensation map 176. As discussed herein, the two compensation maps 176 may be programmed to different input voltage values. For example, points 302 and 304 may illustrate a bounding set including a high voltage input value and a low voltage input value, respectively. To determine the voltage offset value 254 associated with input voltage values between the points 302 and 304, interpolation may be used. For example, the line 306 illustrates a linear interpolation between the point 302 and the 304. Indeed, the step values between corresponding input voltage values 254 of the compensation maps 176 may be programmed such that linear interpolation between entries and/or input voltage values of the compensation maps 176 may be supported. For example, the input voltage values may be fully programmable as u3.16 values and the step values between corresponding input voltage values may be u0.28 values.

In certain instances, voltage offset values 252 associated with input voltage values 254 outside (e.g., greater than, less than) bounding set may be clipped to a nearest compensation map 176. For example, as illustrated by lines 308 and 310, the voltage offset value may be clipped to be similar or substantially similar to the voltage offset value at points 302 and 304, respectively. That is, a voltage offset value 252 associated with an input voltage value 254 greater than the high input voltage value may be similar or substantially similar to the voltage offset value 252 associated with the high input voltage value. A voltage offset value 252 associated with an input voltage value 254 less than the low input voltage value may be similar or substantially similar to the voltage offset value associated with the low input voltage value. Indeed, the SPUC block 136 may determine the voltage offset value for both the low voltage value and the high voltage values outputted by the first set of LUTs 170. In certain instances, clipping to the nearest compensation map 176 may reduce power and/or processing time to determine the voltage offset value 252.

Figure 14:
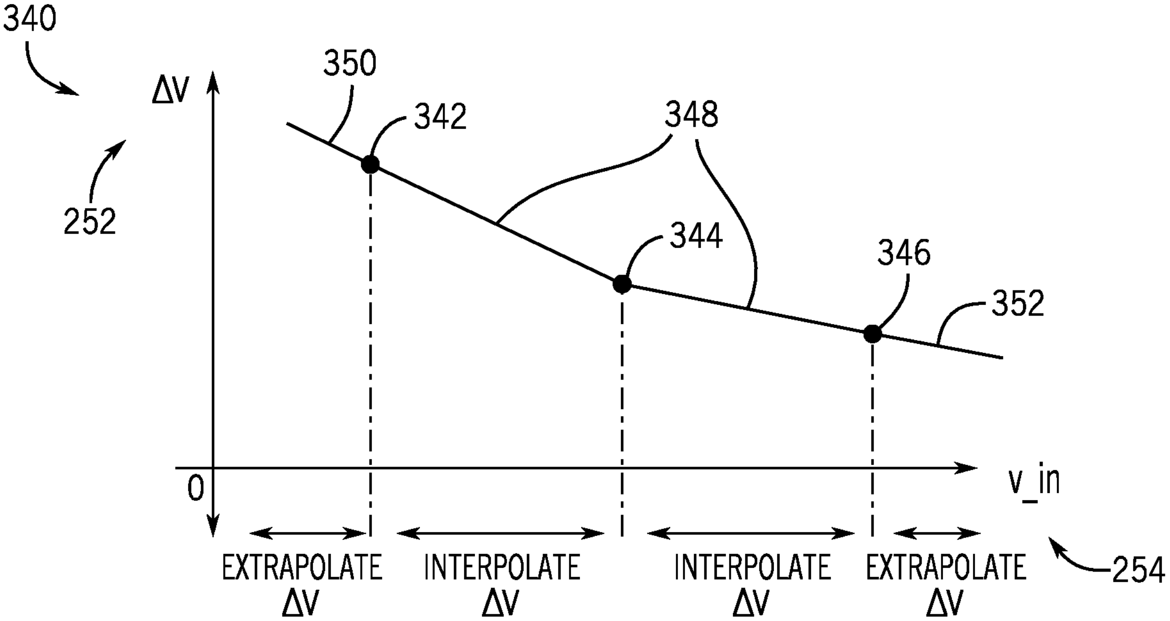
FIG. 14 is a graphical representation of determining a uniformity compensation using three compensation maps and extrapolating to a nearest compensation map, in accordance with an embodiment.

FIG. 14 illustrates a graph 340 of determining a voltage offset value 252 using three compensation map 176 and extrapolating from the nearest compensation map 176. As discussed herein, three compensation maps may be used when the brightness level 172 may be below a second brightness threshold. For example, the brightness level 172 may indicate very low luminance levels, such as below 15 nits. At very low luminance levels, the current-voltage relationship of the display pixel 54 may become highly non-linear. As such, interpolation between multiple input voltage values may provide an improved compensation to the image data and provide for display pixel uniformity. To this end, three compensation maps 176 may be programmed with different input voltage values 254 and the voltage offset value 252 may be determined based on interpolation between the three compensation maps 176.

With the foregoing in mind, the graph 340 illustrates a voltage offset value 252 over an input voltage value 254 (e.g., voltage value of the source image data 132). Two bounding sets may be determined based on the input voltage values of the three compensation maps 176. A first bounding set may include points 342 and points 344 and a second bounding set may include points 344 and 346. Within the bounding sets, the voltage offset value 252 may be determined based on interpolation between the input voltage values 254. Indeed, interpolation between the three compensation maps 176 may be used to determine the voltage offset value. As illustrated by line segment 348, the voltage offset value 252 may be determined by linear interpolation between points 342 and 344. As illustrated by line segment 350, the voltage offset value 252 may be determined by linear interpolation between points 344 and 346. Having additional input voltage value points (e.g., points 342, 344, 346) may adjust a slope of the line segments (e.g., line segment 348, 350), which may account for the non-linear current-voltage relationship of the display pixel 54. In this way, the interpolated voltage offset value 252 may provide improved compensation to the image data, thereby improving display pixel uniformity across a high dynamic range. Although the graph 340 illustrates linear interpolation between each of the points, in other embodiments non-linear interpolation may be supported.

For input voltage values 254 outside of the two bounding sets, the voltage offset value 252 may be determined by extrapolation to a nearest compensation map 176. By way of example, the point 342 may correspond to an input voltage value of a first compensation map 176, the point 344 may correspond to an input voltage value of a second compensation map 176, and/or the point 346 may correspond to an input voltage value of a third compensation map 176. To determine a voltage offset value 252 associated with an input voltage value 254 less than the point 342 (e.g., illustrating a lower input voltage value) extrapolation from the point 342 may be used. For example, linear extrapolation from the first compensation map 176 may be used to determine the voltage offset value 252. As illustrated by line segment 352, linear extrapolation from the point 342 may be used to determine the voltage offset value 252. In another example, linear extrapolation from the third compensation map 176 may be used to determine voltage offset values 252 associated with input voltage values greater than an upper input voltage value (e.g., point 346 illustrating an upper input voltage value). As illustrated by the line 344, linear extrapolation from the point 346 may be used to determine the voltage offset value 252. While the illustrated extrapolation is linear, in certain embodiments the extrapolation technique may be non-linear. In certain instances, the SPUC block 136 may determine the voltage offset value for both the low voltage value and the high voltage values outputted by the first set of LUTs 170 using three compensation maps 176 and extrapolation.

Figure 15:
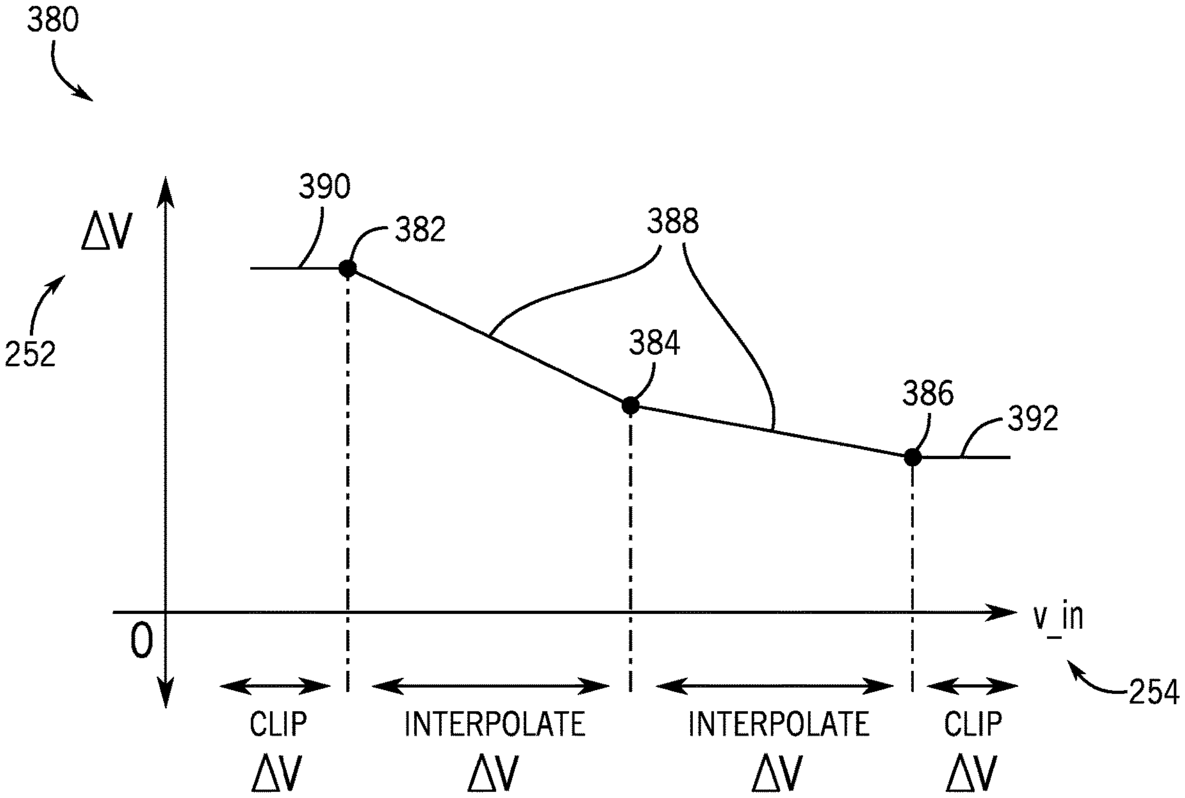
FIG. 15 is a graphical representation of determining a uniformity compensation using three compensation maps and clipping to a nearest compensation map, in accordance with an embodiment.

With the foregoing in mind, FIG. 15 illustrates a graph 380 of determining a voltage offset using two compensation maps 176 and clipping to a nearest compensation map 176. The graph 380 illustrates a voltage offset value 252 over an input voltage value 254 (e.g., voltage value of the source image data 132). For example, two bounding sets may be determined based on the input voltage values 254. A first bounding set may be defined by points 382 and points 384 and a second bounding set may be defined by points 384 and 386. Interpolation may be used to determine voltage offset values 252 associated with input voltage values 254 between the bounding sets. As illustrated by the line 388, linear interpolation between the points 382 and 384 may be used to determine voltage offset values 254. As illustrated by the line 388, linear interpolation between the points 384 and 386 may be used to determine voltage offset values.

To determine voltage offset values 252 associated with input voltage values 254 outside of the bounding sets, clipping to a nearest compensation map 176 may be performed. For example, voltage offset values 252 associated with input voltage values 254 less than the point 382 may be clipped to a voltage offset value equivalent to the voltage offset of point 382. In another example, input voltage values 254 greater than the point 386 may be clipped to the voltage offset value 254 equivalent to the voltage offset value 254 of the point 386. That is, the voltage offset value 254 may be determined by clipping to a maximum input voltage value of a first compensation map 176 and/or a minimum input voltage value of a second compensation map 176.

Indeed, the SPUC block 136 may determine the voltage offset value for both the low voltage value and the high voltage values outputted by the first set of LUTs 170 using at least one compensation map 176. For example, the SPUC block 136 may determine the brightness level 172 is above a brightness threshold and retrieve one compensation map 176 to determine the compensation. Retrieving and utilizing one compensation map 176 may reduce power consumption and/or processing time by the SPUC block 136. In another example, the SPUC block 136 may determine the brightness level 172 is below the brightness threshold but above an additional brightness threshold. For example, in low luminance conditions, the SPUC block 136 may retrieve and use two compensation maps 176 to determine the compensation. In such cases, interpolation between two input voltage values may provide improved compensation with respect to the non-linear current-voltage relationship of the display pixel 54. Still in other instances, the SPUC block 136 may determine the brightness level is below the additional brightness threshold, which may correspond to very low luminance levels in which the current-voltage relationship of the display pixel 54 becomes highly non-linear. To this end, the SPUC block 136 may retrieve and use three compensation maps to determine the compensation. Although the examples discussed herein include three compensation maps, in certain embodiments, 4, 5, 6, 7, 8 or more compensation maps may be stored and used for uniformity corrections. In this way, display pixel uniformity corrections may be determined using compensation maps to adjust image data values accordingly.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as “means for [perform]ing [a function] . . . ” or “step for [perform]ing [a function] . . . ”, it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:
- a display panel comprising display pixels; and
- image processing circuitry coupled to the display panel, the image processing circuitry configured to:
  - convert gray level data corresponding to a first display pixel of the display pixels to first voltage data;
  - receive a brightness level of the display panel;
  - compare the brightness level to a plurality of threshold brightness levels;
  - retrieve a number of compensation maps based on the comparison;
  - determine a voltage offset value based on the first voltage data and the number of compensation maps;
  - generate compensated voltage data using the voltage offset value and the first voltage data; and
  - convert the compensated voltage data into compensated gray level data for the first display pixel.

2. The electronic device of claim 1, wherein the image processing circuitry is configured to:
- retrieve one compensation map based on the brightness level being above a first threshold brightness level of the plurality of threshold brightness levels;
- retrieve two compensation maps based on the brightness level being below the first threshold brightness level and above a second brightness level of the plurality of threshold brightness levels; and
- retrieve at least three compensation maps based on the brightness level being below a second threshold brightness level of the plurality of threshold brightness levels.

3. The electronic device of claim 2, wherein the image processing circuitry is configured to convert the gray level data to the first voltage data by:
- determining a first voltage value of the first voltage data based on the gray level data and a first lookup table of a first set of lookup tables; and
- determining a second voltage value of the first voltage data based on the gray level data and a second lookup table of the first set of lookup tables.

4. The electronic device of claim 3, wherein the image processing circuitry is configured to determine the voltage offset value by:
- determining a first voltage offset value of the voltage offset value by interpolating between the at least three compensation maps and the first voltage value; and
- determining a second voltage offset value of the voltage offset value by interpolating between the at least three compensation maps and the second voltage value.

5. The electronic device of claim 4, wherein converting the compensated voltage data into the compensated gray level data comprises:
- determining a first gray level based on a first lookup table of a second set of lookup tables and a first compensated voltage value comprising the first voltage offset value and the first voltage value;
- determining a second gray level based on a second lookup table of the second set of lookup tables and a second compensated voltage value comprising the second voltage offset value and the second voltage value; and
- interpolating between the first gray level and the second gray level.

6. The electronic device of claim 2, wherein determining the voltage offset value comprises extrapolating from a nearest compensation map of the at least three compensation maps based on the first voltage data.

7. The electronic device of claim 2, wherein determining the voltage offset value comprises clipping to a nearest compensation map of the three compensation maps based on the first voltage data.

8. The electronic device of claim 1, wherein converting the gray level data to the first voltage data comprises:
- configuring a first set of lookup tables based on the brightness level of the display panel, wherein each of the first set of lookup tables comprises a gray level and a voltage value; and
- determining a high voltage value and a low voltage value based on the first set of lookup tables and the gray level data.

9. The electronic device of claim 1, wherein determining the voltage offset value comprises:
- determining a bounding set based on at least two compensation maps, wherein the bounding set comprises a low input voltage value and a high input voltage value; and
- determining the voltage offset value based on the first voltage data and the bounding set by interpolation, extrapolation, or clipping.

10. The electronic device of claim 1, wherein the image processing circuitry is configured to:
- retrieve a plurality of compressed compensation maps from a memory, wherein each of the plurality of compressed compensation maps is stored as a compressed frame buffer; and
- spatially interpolate each of the plurality of compressed compensation maps.

11. Processing circuitry, comprising:
- first conversion circuitry configured to convert image data corresponding to a display pixel of a plurality of display pixels of an electronic display from gray level data of the image data to first voltage data;
- non-uniformity correction circuitry configured to generate first compensated voltage data corresponding to the display pixel by:
  - comparing a brightness level of the electronic display to a plurality of threshold brightness levels;
  - retrieving one compensation map based on the brightness level being above a first threshold brightness level of the plurality of threshold brightness levels;

retrieving at least two compensation maps based on the brightness level being below the first threshold brightness level; and applying a voltage offset to the first voltage data based on the first voltage data and a number of compensation maps; and second conversion circuitry configured to convert the first compensated voltage data to compensated gray level data corresponding to the display pixel.

12. The processing circuitry of claim 11, wherein the non-uniformity correction circuitry is configured to:

retrieve at least three compensation maps based on the brightness level of the electronic display being below the first threshold brightness level and a second threshold brightness level of the plurality of threshold brightness levels, wherein the first threshold brightness level is greater than the second threshold brightness level; and determine a bounding set based on a low voltage value of the at least three compensation maps, a high voltage value of the at least three compensation maps, or both.

13. The processing circuitry of claim 12, wherein the non-uniformity correction circuitry is configured to:

determine first values of the first voltage data within the bounding set; and generate the voltage offset by interpolating between the at least three compensation maps based on the first values.

14. The processing circuitry of claim 13, wherein the non-uniformity correction circuitry is configured to:

determine second values of the first voltage data outside of the bounding set; and generate the voltage offset by extrapolating to a nearest compensation map of the at least three compensation maps, clipping to the nearest compensation map of the at least three compensation maps, or both based on the second values.

15. A method comprising:

obtaining, via processing circuitry, image data, wherein the image data comprises input voltage values for a first display pixel of a plurality of display pixels of an electronic display;

receiving, via the processing circuitry, a brightness level of the electronic display;

comparing, via the processing circuitry, the brightness level to a plurality of threshold brightness levels;

retrieving, via the processing circuitry, a number of compensation maps based on the comparison; and generating, via the processing circuitry, compensated image data by applying a compensation to the image data based on at least one compensation map of the number of compensation maps.

16. The method of claim 15, wherein retrieving, via the processing circuitry, the number of compensation maps comprises:

retrieving one compensation map based on the brightness level being above a first threshold brightness level of the plurality of threshold brightness levels;

retrieving two compensation maps based on the brightness level being below the first threshold brightness level and above a second threshold brightness level of the plurality of threshold brightness levels; and retrieving three compensation maps based on the brightness level being below the second threshold brightness level.

17. The method of claim 15, wherein generating, via the processing circuitry, the compensated image data comprises:

determining a bounding set based on the at least one compensation map, wherein the bounding set comprises a low voltage, a high voltage, or both;

determining the compensation by interpolating between the at least one compensation map using the image data based on the image data being within the bounding set; and applying the compensation to the image data.

18. The method of claim 15, wherein generating, via the processing circuitry, the compensated image data comprises:

determining a bounding set based on the at least one compensation map, wherein the bounding set comprises a low voltage, a high voltage, or both; and determining the compensation by extrapolating or clipping to a nearest compensation map of the at least one compensation map using the image data based on the image data being outside the bounding set.

19. The method of claim 15, wherein retrieving, via the processing circuitry, the number of compensation maps comprises:

retrieving a compressed frame buffer of the at least one compensation map; and up-sampling the compressed frame buffer using spatial interpolation, bilinear interpolation, nearest neighbor, or a combination thereof.

20. The electronic device of claim 2, wherein the first threshold brightness level is greater than the second threshold brightness level.

* * * * *